G. E. DICKSON.

DEVICE FOR PROVIDING RAILROAD ACCIDENT INSURANCE.

APPLICATION FILED AUG. 21, 1922.

Reissued Sept. 26, 1922. 15,459.

INVENTOR:
George E. Dickson
BY Arthur W. Nelson
ATTY.

Reissued Sept. 26, 1922. Re. 15,459

UNITED STATES PATENT OFFICE.

GEORGE E. DICKSON, OF EVANSTON, ILLINOIS.

DEVICE FOR PROVIDING RAILROAD-ACCIDENT INSURANCE.

Original No. 1,408,175, dated February 28, 1922, Serial No. 376,544, filed April 26, 1920. Application for reissue filed August 21, 1922. Serial No. 583,067.

*To all whom it may concern:*

Be it known that I, GEORGE E. DICKSON, a citizen of the United States, and a resident of Evanston, county of Cook, and State of Illinois, have invented certain new and useful Improvements in Devices for Providing Railroad-Accident Insurance, of which the following is a specification.

Numerous attempts have been made to provide means for insuring passengers in conjunction with a railroad trip. None of the proposed means have met with any degree of success for one or more reasons, and while it is possible to purchase accident insurance at some ticket offices, the passenger agents are told not to urge the sale of such insurance because of the time and trouble incident to the issuance of the policy. This course is pursued in the face of the fact that the railroad company receives a substantial percentage of the premium paid for the policies issued by its agents.

Again it has been proposed to issue an insurance policy as a part of a railroad ticket, but such proposal has not proven practicable for a number of reasons among which may be noted the large size of the ticket required, the difficulty, and, in fact, impossibility, of complying with the laws of different States relative to standard provisions of such policies, the size of type in which insurance policies must be printed, and the work involved in the issuance of such insurance.

The general object of my invention is to provide devices for issuing insurance to railroad passengers whereby it shall be possible for railroad ticket agents to issue insurance with such ease that the time required shall not be appreciably more than is required merely to issue a transportation ticket.

Another object of my invention is to provide devices for issuing insurance to railroad passengers in conjunction with a passage ticket whereby the size of the ticket can be as small as desired, thus enabling the handling thereof with the usual railroad passenger ticket facilities, and also effecting the saving of an enormous amount of paper.

Again it is an object of my invention to provide devices for issuing insurance to railroad passengers in conjunction with a passage ticket whereby the requirements of the laws of all States as to standard provisions and the size of type required in insurance policies can be complied with, and at the same time include any and all additional provisions that may be necessary fully and completely to define the insurance risk.

My invention consists generally in means whereby the above named objects together with others that will appear hereinafter are attained, and my invention will be more readily understood by reference to the accompanying drawings which illustrate suitable means whereby the invention can be practised.

Figure 1:
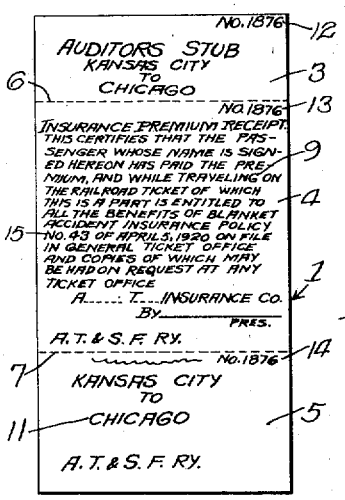
Fig. 1 is a face view of a device used in issuing insurance to a passenger and embodying my invention.
Figure 2:
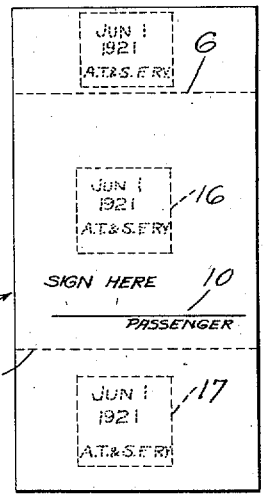
Fig. 2 is a view of the reverse side of the device shown in Fig. 1.

I shall first briefly describe the devices shown in the drawings and then follow with a statement of the method of use wherein their co-operative functioning occurs.

1, represents a ticket such as is provided for the passenger agent for use in issuing to passengers.

2, represents a blanket accident insurance policy, the original of which is on file with the general passenger agent of the railroad.

Device 1, may vary widely with respect to size, printed matter thereon, and with respect to the divisible parts thereof but it will always embody certain of the fundamental characteristics shown in the drawings. As here shown, device 1, is divided into three easily separable parts 3, 4 and 5 as by means of scoring 6 and 7. On its face side part 3 bears an inscription of such character as to furnish the railroad auditor with desired information. On the face side of portion 4, I provide printed matter 9, which in substance indicates that it is a receipt certifying that the passenger whose name is signed on this portion has paid a premium such as will entitle him to the benefits of the insurance provided by blanket insurance policy 2. As here shown, the reverse side of portion 4 is provided with a line 10 for signature of passenger.

Portion 5, in the present instance, is provided with an inscription 11 indicative of the transportation to which passenger is entitled.

Portions 3, 4, and 5 are provided with similar identifying numbers indicated at 12, 13 and 14, respectively.

Portion 4 bears, as at 15, a number and date which corresponds to the number and date 15′ which the blanket accident insurance policy 2, bears.

Figure 4:
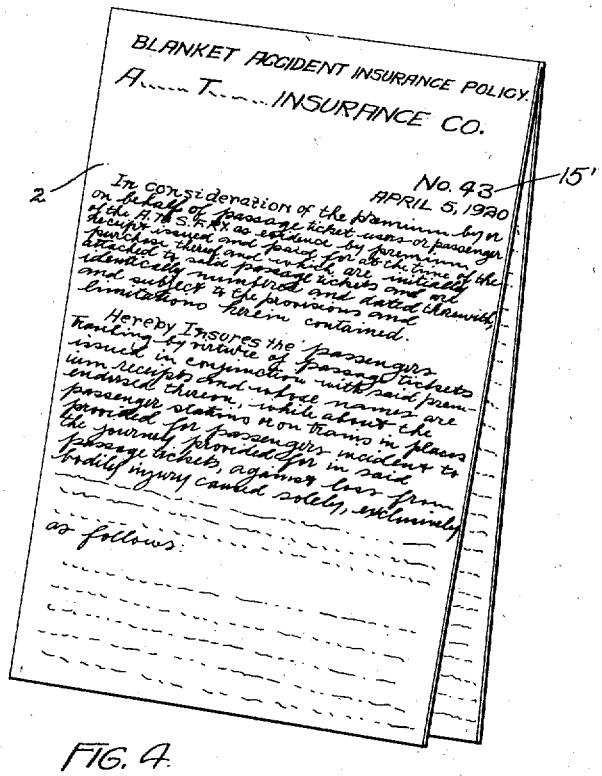
Fig. 4 is a perspective view of a device which is related to the devices shown in Figs. 1, 2 and 3.

The operation and use are as follows: The railroad and the insurance company enter into an insurance contract. This contract or policy is entitled blanket accident insurance policy (illustrated in Fig. 4, and defines fully and completely the risk that the insurance company assumes). Such a policy, in order to state the risk definitely, will be of considerable size, probably three or four pages of legal size, but this can be as large as necessary and can be printed in type sufficiently large to comply with the laws of any and all States because but a single policy is issued to the railroad company. But what is even more important, this can contain the standard provisions required by the laws of all of the leading States. This policy is kept on file by the railroad where it may be examined by any one having an interest therein. Also copies of this policy may be provided so that any one interested may, upon request, secure a copy from any ticket agent.

A passenger in purchasing a ticket merely states whether or not he wants insurance and if so he is given portions 4 and 5, which will thereupon be stamped with the date of issuance on the back thereof as indicated by means of dotted lines at 16, and 17. This the agent can easily do as he must date every ticket issued and hence has proper facilities. Inasmuch as portion 4 is a mere receipt and not an insurance policy it can be made to conform to the size of the transportation part, if desired, for convenience of issuance and handling by the ticket agent.

When issuing the transportation with the insurance receipt a sum equal say to one per cent of the cost of the ticket is added and paid for by the passenger. This amount is ample to provide insurance up to $5000.00 for the trip.

The passenger merely signs his name on portion 4 at line 10, as a means of identification, and retains this as his receipt in case it is necessary to claim a benefit under blanket accident insurance policy 2, at any time.

If the passenger does not desire insurance protection the ticket agent merely issues portion 5 to him in the usual manner, thus retaining portion 4 in his file.

The railroad company reports to the insurance company from day to day the premiums received, which it can readily do by counting the tickets that have been issued and with respect to which no portion 4 remains.

The portion 12, i. e., auditor's stub is not essential, but is shown as some railroads use this form of check. If desired, it can be used without interfering with the use and issuance of device embodying my invention.

Figure 3:
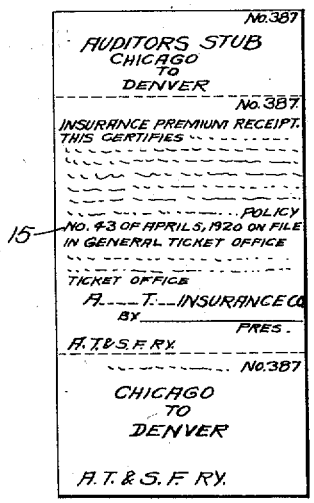
Fig. 3 is a face view of a device similar to that shown in Fig. 1 but covering transportation between different points.

In Fig. 3, I have shown a device which corresponds generally to the device shown in Fig. 1 except that the transportation portion indicates that transportation or passage is furnished between different points. The premium receipt portion, however, is the same as that of the device shown in Fig. 1, and it bears the same identifying mark 15. Thus it relates to blanket accident insurance policy 2, in the same manner. This illustrates the point that the transportation portion may and will vary as desired but that the premium receipt portions will be alike.

The many advantageous features of the invention will be understood by those skilled in this art without further comment.

I claim:

1. Means for use in providing insurance for travelers consisting of a transportation ticket and an insurance premium receipt, said transportation ticket and insurance premium receipt being suitably identified with each other, the ticket bearing printed matter indicating the transportation covered by it and the receipt bearing a printed statement indicating that the holder is insured under a specified blanket insurance policy.

2. As an article of manufacture, a device for use in providing insurance for travelers, consisting of a transportation ticket and an attached insurance premium receipt, said ticket and receipt being suitably identified with each other and the ticket bearing printed matter indicating the transportation covered by it and the receipt bearing a printed statement indicating that the holder is insured under a specified blanket insurance policy.

3. A ticket-insurance premium receipt device, in combination with a blanket accident insurance policy having a statement inscribed thereon granting protection to persons while in the use of transportation tickets, said ticket-insurance premium receipt device being composed of a transportation portion and an insurance premium receipt portion having mutually identifying marks, and said insurance premium receipt portion bearing matter identifying it with said blanket accident insurance policy.

In testimony whereof, I have hereunto set my hand, this 18th day of August, 1922.

GEORGE E. DICKSON.